United States Patent
Bayer et al.

[11] Patent Number: 6,001,491
[45] Date of Patent: Dec. 14, 1999

[54] THERMOPLASTIC PHOTOLUMINESCENT PILINGS AND PROCESS FOR MAKING THEREOF

[75] Inventors: John C. Bayer, Folsom; Thomas C. Gandolfo, Covington, both of La.

[73] Assignee: Polysum Technologies, L.L.C., Covington, La.

[21] Appl. No.: 09/022,226

[22] Filed: Feb. 11, 1998

[51] Int. Cl.⁶ ........................................ B32B 27/00
[52] U.S. Cl. ........................ 428/500; 428/76; 428/501; 428/515; 428/690; 250/458.1; 250/462.1; 250/465.1; 252/301.36
[58] Field of Search ................... 428/46, 76, 500, 428/501, 515, 690; 250/462.1, 465.1, 458.1; 252/301.36; 362/84, 812; 40/542; 405/231

[56] References Cited

U.S. PATENT DOCUMENTS

| | | | |
|---|---|---|---|
| 4,211,813 | 7/1980 | Gravisse et al. | 428/263 |
| 4,812,660 | 3/1989 | Lindmayer | 250/484.1 |
| 4,875,799 | 10/1989 | Harrison | 404/12 |
| 5,490,344 | 2/1996 | Bussiere | 43/17.5 |
| 5,607,621 | 3/1997 | Ishihara et al. | 252/301.36 |
| 5,658,519 | 8/1997 | March et al. | 264/2.77 |
| 5,799,870 | 9/1998 | Bayer | 238/84 |

FOREIGN PATENT DOCUMENTS

| | | |
|---|---|---|
| 469137 | 2/1992 | European Pat. Off. |
| 2520322 | 7/1983 | France. |
| 2267379 | 12/1993 | Germany. |

*Primary Examiner*—Paul Thibodeau
*Assistant Examiner*—Sheeba Ahmed
*Attorney, Agent, or Firm*—Garvey, Smith, Nehrbass & Doody, LLC

[57] ABSTRACT

A composite marine piling is provided comprising (a) a core element comprising filler and a thermoplastic resin and (b) a sheath comprising thermoplastic resin and a light absorbing/emitting material. The filled thermoplastic composition of the core element is melt processed (for example injection or compression molded) to produce the filled thermoplastic composite marine piling core element. The sheath covers top of the core element to provide the top portion of the piling with a light responsive sheath to enhance the visibility of the piling to ship operators. The piling is a useful replacement for wood pilings and has several physical property advantages and preferably being suitable made from recycled plastic and waste byproduct filler.

10 Claims, 4 Drawing Sheets

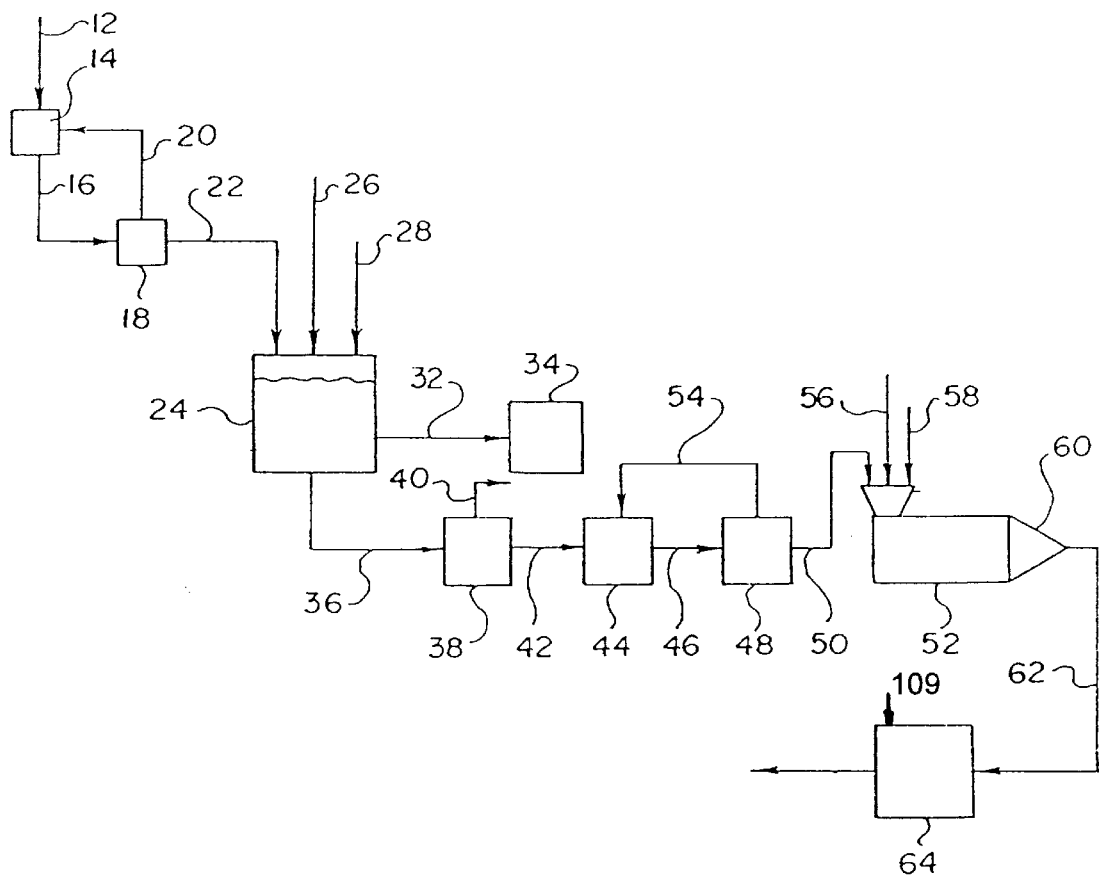
F I G . 1

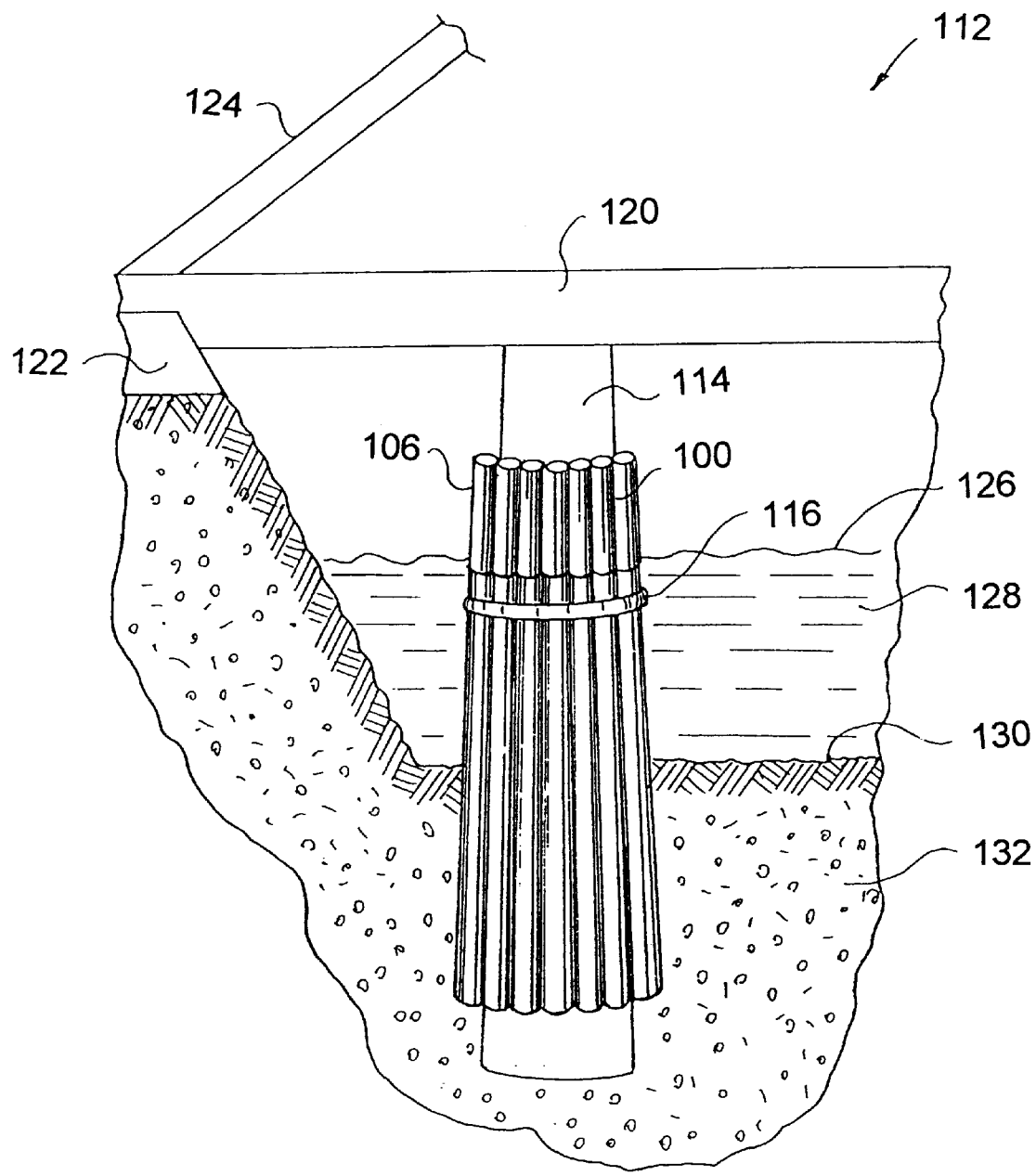
F I G. 3

THERMOPLASTIC PHOTOLUMINESCENT PILINGS AND PROCESS FOR MAKING THEREOF

BACKGROUND OF THE INVENTION

1. Field of the Invention

The present invention relates to protective pilings and processes for making thereof, and more particularly relates to pilings and processes for making thereof.

2. Description of the Related Art

In the shipping industry, the ships (barges) traveling on narrow waterways such as rivers and bays have need to pass under bridges and adjacent to bridge supports and other structures. Historically, these bridge supports have been damaged by accidental ramming and rubbing by heavily loaded ships and barges resulting in undesired damage to the bridges thereby reducing the useful lives of such bridges and structure, and such ships have also been damaged as a result of such undesired contact with the structures. Prior efforts to protect bridges and structure have included the use of protective outer wood pilings which are placed around the structure and banded or bolted together to provide a protective outer layer. The use of marine fenders has been disclosed in various patents, see for example Young U.S. Pat. No. 4,281,610 issued Aug. 4, 1981 which discloses a marine fender comprising a sheet of resilient material and an elastomeric core; Nill U.S. Pat. No. 5,037,242 which discloses a dock fender made of PVC pipe; Matthews U.S. Pat. No. 3,950,953 issued Apr. 20, 1976 which discloses a piling fender; Smath U.S. Pat. No. 4,804,296 issued Feb. 14, 1989 which discloses a floatable marine fender device; James U.S. Pat. No. 5,007,363 issued Apr. 16, 1991 which discloses a buoyant marine fender; Watkins U.S. Pat. No. 5,013,272 issued May 7, 1991 which discloses a boat fender made of flexible plastic and having a hollow interior; Stevens U.S. Pat. No. 5,018,471 issued May 28, 1991 which discloses a marine fender for pilings of marine structures, all of which are incorporated herein by reference. These various prior fenders exhibit one or more of the following problems: (a) they are not easily visible at night (low light conditions) resulting in them not providing warning to the ship (barge) approaching the structure and/or (b) they exhibit floating characteristics, and other characteristics, which make it difficult to use them as pilings or as mostly submerge fenders.

Consequently, there is a need and a desire to provide pilings which exhibit certain improved characteristics such as improved visibility and improved density characteristics.

BRIEF DESCRIPTION OF THE DRAWINGS

FIG. 1 is a schematic of a process for making thermoplastic composite pilings of the present invention;

FIG. 3 is a perspective cutaway view of a bridge structure having pilings according to the present invention.

SUMMARY OF THE INVENTION

Figure 2:
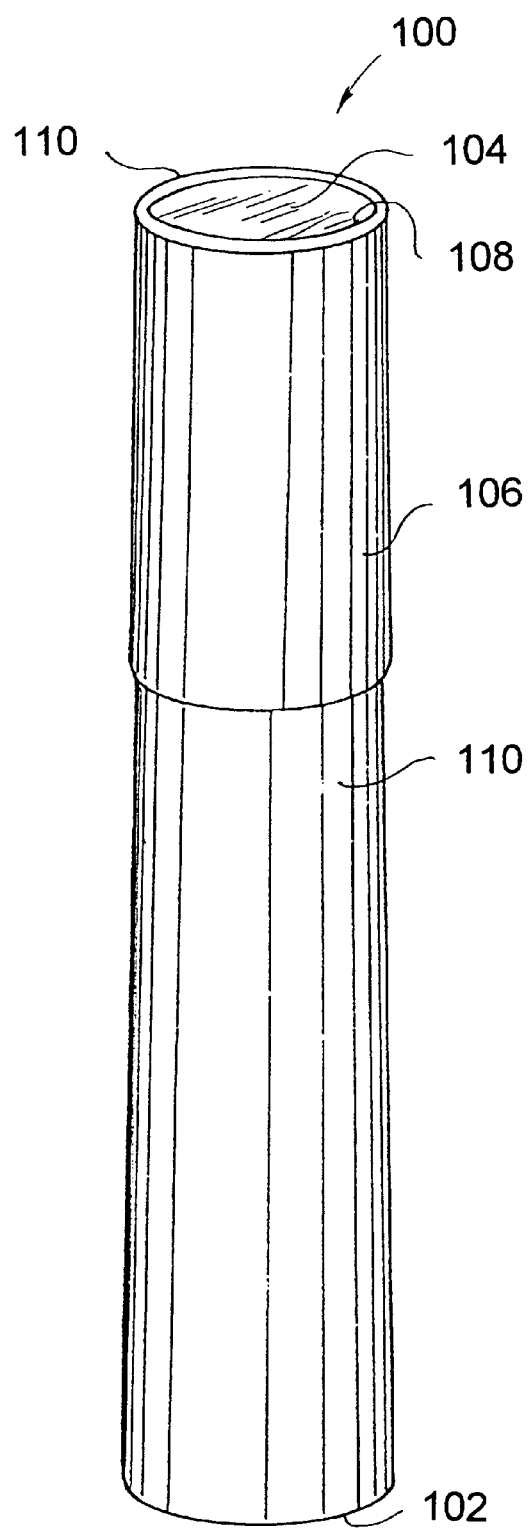
FIG. 2 is a perspective view of a composite piling of the present invention.

A composite piling (which also functions as a fender) is provided comprising (a) a core of a composite comprising (i) a filler and (ii) a thermoplastic resin, and (b) an outer layer (sheath, coating) of light absorbing/emitting (responsive) material. The composite is dense and preferably exhibits a density of greater than 1.0 g/cm$^3$, and preferably greater than 2.0 g/cm$^3$. A suitable fillers are calcium sulfate, phospho-gypsum and (calcium fluoride) fluoro-gypsum. Phospho-gypsum may be obtained from fertilizer processes involving (a) providing phosphate rock, (b) contacting the phosphate rock with sulphuric acid in the presence of water to produce phosphoric acid and a calcium sulphate, (c) separating at least a portion of the phosphoric acid from the calcium sulphate to produce a phosphoric acid product and a calcium sulphate byproduct, (d) drying the calcium sulphate byproduct to remove water therefrom. The calcium sulphate byproduct (phospho-gypsum) is then admixed with a thermoplastic and a functionalized compound to produce a filled thermoplastic composition which is suitable as the material for the core composite of the piling (protective article) of the present invention. The filled thermoplastic composition is then melt processed (for example injection or compression molded) to produce a filled thermoplastic core element. An outer layer (sheath) is affixed (adhered) to the core element, and may be created by coextrusion of the core with outer layer or may be separately applied over the core. The outer layer comprises a translucent or clear thermoplastic resin, such as polycarbonate resin, and is melt mixed with a photoluminescent material (light absorbing/emitting light responsive).

DETAILED DESCRIPTION OF THE INVENTION

Composite thermoplastic pilings (protective articles) and processes for making thereof are provided. The thermoplastic pilings comprise (a) a core element comprising (i) a thermoplastic resin and (ii) a filler, and (b) an outer layer (sheath) comprising (i) a transparent (or translucent or clear) thermoplastic resin and a light responsive material, preferably a photoluminescent material. The composite (and protective article) is dense and preferably exhibits a density of greater than 1.0 g/cm$^3$, and preferably greater than 2.0 g/cm$^3$.

The filler is preferably phospho-gypsum and may be obtained as a byproduct from a fertilizer manufacturing process involving (a) providing phosphate rock, (b) contacting the phosphate rock with sulphuric acid in the presence of water to produce phosphoric acid and a calcium sulphate byproduct, (c) separating at least a portion of the phosphoric acid from the calcium sulphate to produce a phosphoric acid product and a calcium sulphate byproduct, and (d) drying the calcium sulphate byproduct to remove water therefrom. A thermoplastic filled composition suitable as the core is then made by admixing the calcium sulphate byproduct with a thermoplastic resin and a functionalized compound. The protective article (and/or core element) may then be manufactured by melt processing (for example injection molding or compression molding or coextrusion) the thermoplastic composition.

Manufacturing of fertilizers from phosphate rocks by wet processes are well known. The processes involve (a) providing phosphate rocks and converting (reducing the size of )phosphate rocks into phosphate particulates, preferably by grinding, and preferably involves converting phosphate rocks having weight average diameter particle sizes of greater than 0.1 inches to small particulates having sizes of less than 0.01 inches, more preferably less than 0.005 inches, and most preferably less than 0.003 inches, for example into a weight average diameter particulate sizes of no greater than 60 mesh, more preferably no greater than 115 mesh, and most preferably no greater than 200 mesh. The smaller the particulate size, the greater the effective surface area to volume of the phosphate particulates for contacting with the sulphuric acid in the process Various grinding and screening systems are suitable for converting phosphate rocks into phosphate particulates having the desired size. Grinding may be achieved by hammer mills, ring roller mills, and ball mills. Screening may be achieved by vibrating screens or other suitable screening devices.

The phosphate solids, preferably in the form of small phosphate particulates, are then contacted with sulphuric acid to the presence of water to form a reaction mass resulting in the production of (formation of) phosphoric acid and a calcium sulphate, as is known in the art. The calcium sulphate typically takes the form of gypsum and/or hemihydrate. The calcium sulphate is then removed from the reaction mass to yield a phosphoric acid product and a calcium sulphate byproduct. Typical calcium sulphate byproducts from this step contain amounts of water and phosphate, and are typically stock piled as an undesired waste product.

In the present process the calcium sulphate byproduct is then dried (dewatered) to produce a calcium sulphate/phosphate product having preferably having less than 1 percent by weight water, more preferably less than 0.5% water, and most preferably less than 0.1% by weight water based on the total weight of the solid byproduct. Drying the product reduces the risk of undesired thermoplastic degradation in the process due to the presence of high levels of residual water and high temperatures in the presence of ingredients in the composition. Other fillers such as fluorogypsums, calcium fluoride, calcium difluoride, fluorspar, barites, barytes, barium sulphate (BaSO4), galena and mica may be used a portion of the inorganic material. Galena may be used as a suitable filler in view of its high density, and large amounts of galena waster product piles are available as a source of the filler. Galena for example has a specific gravity of at least 7.5.

The process further involves admixing, preferably melt mixing, (a) the filler (waste byproduct, calcium sulphate compound/phosphate byproduct (mixture), galena), (b) a thermoplastic resin such as polyethylene and preferably (c) a functionalized compound to produce a filled thermoplastic composition suitable as the core element for the piling.

Optionally, fiber (metal or glass) reinforcing agents may admixed into the composition. The filled thermoplastic resin composition may then be processed to form a thermoplastic filled composite marine pilings. The pilings may be then used to protect structures and may be used alone or in combination with conventional wood pilings.

The thermoplastic composition preferably comprises (a) a polyolefin resin present at a level of from 10 to 99 percent by weight based on the total weight of the composition, (b) a filler such as a fertilizer wet process byproduct (filler comprising calcium sulphate and phosphate, and optionally other fillers may be utilized comprising calcium fluoride, synthetic fluorspar, calcium difluoride or fluorogypsum) present at a level of from 1 to 90 percent by weight based on the total weight of the composition, and preferably (c) a functionalized compound present at a level of from 0.5 to 10 percent by weight based on the total weight of the composition.

The polyolefin polymers include polymers of monoolefins and diolefins, for example polypropylene, polyisobutylene, polybutene-1, polymethylpentene -1, polyisoprene or polybutadiene, as well as polymers of cycloolefins, for instance of cyclopentene or norbornene, polyethylene, for example high density polyethylene, low density polyethylene and linear low density polyethylene may be used. Mixtures of these polymers, for example mixtures of polypropylene with polyethylene and mixtures of different types of polyethylene, may also be used. Also useful are copolymers of monoolefins and diolefins with each other or with other vinyl monomers, such as, for example, ethylene/propylene, linear low density polyethylene and its mixtures with low density polyethylene, propylene/butene-1, ethylene/hexene, ethylene/ethylpentene, ethylene/heptene, ethylene/octene, propylene/isobutylene, ethylene/butane-1, propylene/butadiene, isobutylene/isoprene, ethylene/alkylacrylates, ethylene/alkyl methacrylates, ethylene/vinyl acetate or ethylene/acrylic acid copolymers and salts thereof and terpolymers of ethylene with propylene and a diene, such as hexadiene, dicyclopentadiene or ethylidenenorbornene, as well as mixtures of such copolymers and their mixtures with polymers mentioned above, or example polypropylene/ethylene-propylene-copolymers, low density polyethylene/ethylene vinyl acetate. Also suitable are polyvinyl chlorides.

Most preferably the thermoplastic resin is a recycled polyolefin resin. The preferred recycled thermoplastic resin is a recycled polyolefin, and most preferably is a recycled high density polyethylene.

Suitable functionalized compounds include epoxidized oils such as epoxidized esters of unsaturated fatty acid which may be made by reacting alcohols with unsaturated fatty acids to produce esters of unsaturated fatty acids, followed by epoxidizing the esters of unsaturated fatty acids. The epoxidizing may be accomplished by treating the ester of an unsaturated fatty acid with a peroxy organic acid, such as perony acetic acid. Suitable alcohols include mono-ols, diols, triols such as glycerols, and higher polyols. Suitable unsaturated fatty acids include mon and poly (di, tri, and higher) unsaturated fatty acids such as oleic acid, linoleic acid, linolenic acid, and arachidonic acid. Naturally occurring esters of unsaturated fatty acids, more particularly glycerides of unsaturated fatty acids, include vegetable oils (chiefly from seeds or nuts), including soybean oil, linseed oil, and cottonseed oil. Generally unsaturated fatty acids have from 4 to 24 carbon atoms. The most preferred epoxidized esters of unsaturated fatty acid is expoxidized soybean oil. Soybean oil is predominantly triglycerides of oleic acid, triglycerides of linoleic acid and triglycerides of linolenic acid. The thermoplastic compositions may also contain metal chelates such as titanium chelates to enhance the properties of the filled composition. Examples of titanium chelates are those represented by the general formulas (HOYO)2Ti(OR)2 or (H2NYO)2Ti(OR)2 wherein Y and R are selected from hydrocarbon groups, preferably C1 to C20 alkyl groups, and more preferably C2 to C8 alkyl groups and titanium chelates include, but are not limited to octylene glycol titanate and triethanolamine titanate, and most preferably is octylene glycol titanate. Titanium chelates are commercially available, for example a titanium chelate is available fro Dupont in Mexico under the trademark Titantus. A suitable titanium chelate is isopropyl triisostearoyl titanate CH3(CH3) (CHOTi(OC(O)C17H35) 3. The titanium chelate is preferably present at a level of from 1 to 1000 parts per million (ppm) based on the total weight of the composite, more preferably from 2 to 100 Amounts of mineral oil may also be present, and most preferably 2 ppm.

The plastic compositions may optionally contain flame retardants such as halogenated materials, preferably chlorinated or brominated compounds. The filler of the present invention is of a nature containing phosphates which provides the potential additional advantage of added flame retardency in the composition. Suitable flame proofing additives include low molecular weight bromine compounds, and examples include octabromodiphenyl ethers, tetrabromophthalimide, tribromophenoxymehtane, bis(tribromophenoxy)ethane, poly or oligomeric tetrabromobisphenol A, tris(tribromophenyl)triphosphate, trichlorotetrabromotoluene, hexabromocyclododecane and decabromodiphenyl ether.

The process of the present invention allows for the production fertilizer without the undesired stock piling (or solid waste disposal) of solid byproducts. The present process allows the combined production of fertilizer and useful marine pilings (articles). The presence of the phosphate in the byproduct also provides for possible enhancement in the flame retardancy of the product without the additional expense of purchasing a phosphate flame retardant.

Various other additives such as pigments, dyes, and oxidants, ultraviolet light stabilizers, etc. may be present in the composition or the composition may be free from such additional additives.

The thermoplastic compositions may further comprise neutralizers, primary antioxidants, secondary antioxidants and light stabilizers such as hindered amine light stabilizers.

The polyolefin resin in preferably present at a level of from 10 to 99 percent by weight based on the total weight of the composition (composite, core), more preferably from 25 to 80 percent by weight thereof, and most preferably from 40 to 75 percent by weight thereof. The filler is preferably present at a level of from 1 to 90 percent by weight based on the total weight of the composition (composite, core), more preferably from 20 to 75 percent by weight thereof, and most preferably from 25 to 60 percent by weight thereof. The functionalized compound (epoxidized oil) is preferably present in the composition at a level of from 0.5 to 8 percent by weight based on the total weight of the composition, more preferably from 1 to 5 percent by weight thereof, and most preferably from 2 to 4 percent by weight thereof. If the calcium titanate is used, it is preferably used at levels of from 100 ppm to 2000 ppm based on the total weight of the composition. The composition may further contain reinforcing fiber, such as glass, metal or vegetable fiber (sugar cane bagasse) at levels of from 1 to 10 percent by weight based on the total weight of the composition, more preferably from 2 to 8 percent by weight thereof, and most preferably from 3 to 7 percent by weight thereof.

Suitable pilings may for example have lengths of from 20 feet to 100 feet, more preferably from 30 feet to 50 feet, and most preferably about 40 feet, and diameters (widths) of from 8 inches to 14, more preferably from 10 inches to 14 inches and most preferably about 12 inches.

The pilings have a density of greater than 1.0 due to the amount and density of the filler material, and preferably the pilings have a density in excess of 2.0, preferably between 2.5 and 4.0. The weight of the piling preferably ranges from 750 pounds to 4,000 pounds depending on the level of filler in the composition and size of the piling, and more preferably ranges from 750 pounds to 2,000 pounds. The pilings are preferably cylindrical or slightly tapered having a wider diameter bottom than top. Groups of pilings may be banded or bolted together to form a unit. The pilings preferably have the other layer (sheath, collar) on only the top end (one end) of the piling, for example having only the top half or the top third or top quarter having the outer layer and the bottom half or bottom two thirds or bottom three quarters not having an outer photoluminescent layer. The top portion of the piling is usually the only portion that is primarily out of the water level during use. For example, the bottom half of the piling may be positioned below the mud level (upper surface of the mud) during use, with the top quarter of the piling above the water level (upper surface of the water) and the remaining portion of the piling being between the mud level and the water level. Consequently, the light responsive layer is only needed where it is visible to the ship personnel.

As shown in FIG. 1, the process for making the piling of the present invention preferably involves a first step involving a process for making the filler. The filler may be obtained by process for manufacturing fertilizer wherein the byproduct is utilized as the filler for the piling core composite. The filler production step preferably involves (a) fertilizer manufacturing system (10) wherein phosphate rock (12) (phosphate rock stream (12)) is fed to a size reducing device (14) (grinder (14)) for reducing the phosphate rock into small size particulates which are then fed as intermediate stream (16) to a first screening unit (18) for separating intermediate phosphate stream (16) into (i) a large particle return stream (20) which is returned to the grinder (14) for further size reduction and (ii) a stream (22) of small particulates. The small particulates are then fed to a reaction vessel (24), and a water feed stream (26) and a sulphuric acid feed stream (28) are also fed to the reaction vessel to form a reaction mass (30). In the reaction mass (30) the phosphate rock and the sulphuric acid react to form liquid (aqueous) phosphoric acid and a solid calcium sulphate (gypsum and/or hemihydrate). The liquid phosphoric acid is removed from the vessel (24) as phosphoric acid stream (32) and is retained in a holding container (34) and is used as a fertilizer product, typically after being admixed with other conventional fertilizer elements. The solid calcium sulphate is removed from the vessel (24) as initial calcium sulphate stream (36) which contains undesirably high levels of water (typically in excess of 1 percent by weight based on the total weight of the initial calcium sulphate byproduct). The initial calcium sulphate stream (36) is then fed to a dewatering unit (38) wherein water is removed as water waste stream (40) and a dewatered calcium sulphate stream (42) exits the unit (38). The dewatering unit (38) may be in the form of a press or a heat drying unit or an air drying system, and preferably the dewatered calcium sulphate (42) has a water content of less than 1 percent by weight based on the total weight of the dewatered calcium sulphate. If the drying unit (38) undesirably causes particulate aggregation, then the system preferably further involves a calcium sulphate grinder (44) for reducing the particle size of the aggregated calcium sulphate to produce (I) a reduced particle size intermediate calcium sulphate stream (46) which is fed to a screening device (48) for separating the stream (46) into a small particulate (byproduct stream) (50) which is fed to an extruder (or other melt mixing device) (52) and (ii) a return calcium sulphate stream (54) of relatively larger size particles for return to the grinder (44) for size reduction. Alternatively to phosphogypsum, the filler may be suitably galena (lead sulfide, PbS), and more preferably galena tailings, due to its availability as a mining byproduct and due to its high density.

The extruder (52) may be a conventional melt extruder filled thermoplastics and contains conventional heating and cooling controls for maintaining the extruder within a temperature range suitable for melt processing of the composition. The extruder (52) has an intake throat (54) for receiving the byproduct particulates (50), and for receiving respective amounts thermoplastic resin by resin stream (56) and functionalized compound (epoxidized oil) by functional compound stream (58). The extruder then melt mixes the particulates, resin and functionalized compound and forces the resulting resin composition through a die (60) with a cutting element resulting in pellets (62) (final resin product/ article stream (62)). The process further involves a melt processing unit (64) (extruder) such a coextruder providing an outer coating layer (sheath, sleeve, collar) about the inner core. The sheath may alternatively be made by injection molding, and the sheath may then be place on the core element by slipping it over the top of the core element.

The calcium sulphate byproduct comprises (a) a calcium sulphate and (b) a phosphate. The calcium sulphate is present in the byproduct composition at a level of from 50 percent by weight to 99 percent by weight based on the total weight of the byproduct composition, more typically from 60 to 98 percent by weight thereof, and even more typically from 75 to 95 percent by weight thereof. The phosphate is present in the byproduct composition at a level of from 1 to 50 percent by weight based on the total weight of the byproduct composition, more typically from 2 to 40 percent by weight thereof, and even more typically from 5 to 25 percent by weight thereof. The calcium sulphate may be in the form of gypsum or hemihydrate, in other words the calcium sulphate may be in the form of ($CaSO_4$, $CaSO_4.H_2O$, $CaSO_4.2H_2O$ or mixtures thereof).

As shown in FIG. 2, the piling (100) may generally be in the shape of a cylinder and preferably has a slight taper from the top (102) to the bottom (104) of the piling (100) providing the piling (100) with a relatively wide bottom (104) and a relatively narrow top (102). The shape of the piling (100) is preferably similar to the exterior shape of a conventional wooden piling. The piling (100) has an outer layer (106) which may also be referred to as a sheath (or coating) (106) which covers a top portion (108) of the piling (100) and is preferably affixed (adhered) to a core element (110) of the piling (100).

Figure 4:
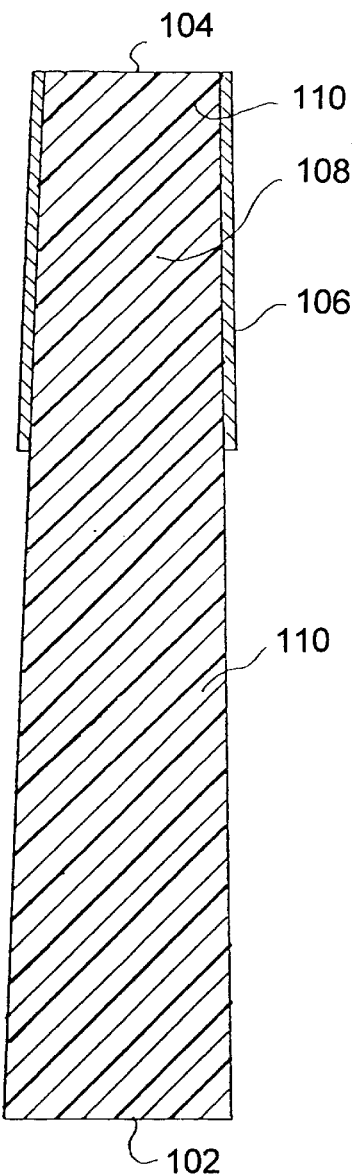
FIG. 4 is a vertical cross-sectional view of the piling of FIG. 2.

FIG. 3 is a cutaway perspective view of a bridge structure (112) which comprises the present pilings (100). The pilings (100) are in protective position around a support column (114) of the bridge (112) to protect the column from ship contact. The pilings (100) are preferably banded (or bolted by bolts, forming clusters) together by a band (116) to secure the pilings about the support column (118). The support column supports the weight of the bridge travel surface (bed) (120). The bridge (112) is preferably supported at its ends by abutments (122) and is also supported by upper structural members (124). The support column (114) extends downwardly from bridge travel road bed (120) down to the water surface (126), through the body of water (128), down through the mud surface (river bed) (130), and deep into the mud (132) to provide a stable foundation for the bridge (112) The pilings (100) extend from above the water surface (126) through the body of water (128) and into the mud (132) and may provide the structure (126) with support as well as with protection from ships (barges) . The pilings (100) have and outer layer (106) which covers (surrounds) the upper portion (108) of the piling (100). The sheath is may optionally be placed on the core (110) by slipping the sheath over the top end of the piling. The sheath is may be slightly tapered to match the taper of the upper portion of the piling as best shown in FIG. 4.

Figure 5:
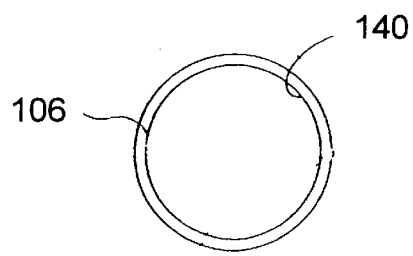
FIG. 5 is a horizontal cross-sectional view of a sheath of a piling according to the present invention.

The sheath (108) comprises a composition (109) (sheath composition stream) (a) a transparent (translucent, clear) thermoplastic resin and (b) a light absorbing/emitting (responsive) material. The thermoplastic resin may suitably be a transparent polyolefin or may be a polycarbonate resin or a polyvinylchloride resin. The light absorbing/emitting (responsive) material is preferably a photoluminescent material, such as the photoluminescent materials disclosed in Lindmayer U.S. Pat. No. 4,812,660 issued Mar. 14, 1989 and Lucky U.S. Pat. No. 3,668,142 issued Jun. 6, 1972, all of which are incorporated herein by reference. As shown in FIG. 5, the inner surface of the sheath may have a thin photoluminescent inner coating (140). Coextrusion may be utilized to form the core and the outer layer. The outer layer is formed (extruded) only about a portion (top portion, first portion) of the core so that when the piling is in use, the portion that is above the water level will be coated while the portion below the water level will be uncoated (not coated) to minimize the expense of the coating material.

Conventional pilings have historically been the scene of numerous undesired collisions between ships (barges) and waterway structures (bridges). Consequently, there is a desire to enhance ship operator (captain) awareness of the existence of each such structure and piling. The photoluminescent sheath preferably with its photoluminescent back coating provides the ship operator with a visible warning after darkness falls (in the evening hours). Light from the sun and then lights from ships and surround areas provide the photoluminescent sheath with a glow, and the photoluminescent back coating provides an additional visual impact in response to the ships lights.

Another suitable filler is fluorogypsum. Fluorogypsum may also be obtained by various processes such as a byproduct produced from the reaction of fluorspar with sulfuric acid in the production of hydrofluoric acid, see Azar Fluorogypsum Waste Solidification Material U.S. Pat. No. 4,935,211 issued Jun. 19, 1990 which is incorporated herein by reference. Fluorogypsum contains mostly calcium sulfate anhydrite and calcium sulfate having water chemically combined therewith, plus small quantities of fluorine containing compounds and possibly small concentrations of sulfuric acid. Disposal ponds for fluorogypsum occupy large areas of useful land and commonly require monitoring and maintenance by the owner. The disposal ponds are constantly increasing in size and quantity of fluorogypsum contained as the related production processes continue. Consequently, there is a problem with the continued accumulation of these byproducts and a need and desire to find a useful product which uses these materials. Processes producing fluorogypsum materials are known, see for example Sardisco et al Recovery of Fluorides From Gypsum U.S. Pat. No. 4,060,586 issued Nov. 29,1977, Johnson U.S. Pat. No. 4,175,944 issued Nov. 27, 1979, Gaynor et al U.S. Pat. No. 4,402,922 issued Sep. 6, 1983 and Czysch et al Production of Low-Fluorine Gypsum as a By-Product in a Phosphoric Acid Process U.S. Pat. No. 4,026,990 issued May 31, 1977, all of which are incorporated herein by reference.

The sheath covers at least a portion of the core element. The sheath comprises (i) a thermoplastic resin and (ii) a photoluminescent material. The thermoplastic resin is preferably present in the sheath at a level of from 70 to 99 percent by weight based on the total weight of the sheath, more preferably from 80 to 98 percent by weight thereof, and most preferably from 90 to 97 percent by weight thereof. A suitable thermoplastic resin is polyethylene, polypropylene and other resins that are either transluscent or transparent, for example various polyolefins are suitable. The photoluminescent material is preferably present in the sheath at a level of from 1 to 30 percent by weight based on the total weight of the sheath, more preferably from 2 to 20 percent by weight thereof, and most preferably from 3 to 10 percent by weight thereof. The photoluminescent material is preferably a phophorescent metal sulphide such as zinc, calcium, cadnium or strontium sulphide as disclosed in Gravisse et al U.S. Pat. No. 4,211,813 issued Jul. 8, 1980 which is incorporated herein by reference.

EXAMPLES

Formulation #1 for the core material was made by admixing suitable : Phospho gypsum (a fertilizer process byproduct blend of calcium sulphate and phosphate) 23.5 pounds, recycled high density polyethylene 16 pounds, epoxidized soybean oil 225 grams and a titanium chelate (titanate) 0.45 grams. The phospho gypsum and recycled high density polyethylene were dry mixed for 5 minutes. The epoxidized soybean oil and the chelate were blended for two minutes. The epoxidized soybean oil and chelate mixture was slowly added to the dry mixture of phospho gypsum and recycled polyethylene while it was mixing in the mixer. The time of mixing all ingredients together was 10 minutes (until compound was thoroughly mixed).

Suitable compositions for use in the manufacture of pilings were made and included admixing 10.5 pounds of phosphogypsum, 4.5 pounds of high density polyethylene (RHDPE), 52.08 grams of epoxidized soya oil and 18.75 grams of titanate.

What is claimed is:

1. A marine piling comprising:
   (a) a core element comprising (i) a thermoplastic resin and (ii) a filler, and
   (b) a sheath covering at least a portion of said element, said sheath comprising (i) a thermoplastic resin and (ii) a photoluminescent material.

2. The piling of claim 1 wherein said piling has a density of at least 1.0 grams per centimeter cubed.

3. The piling of claim 1 wherein said filler comprises (i) a calcium sulfate present at a level of from 50 to 99 percent by weight based on the total weight of the calcium sulfate composition and (ii) a phosphate present at a level of from 1 to 50 percent by weight based on the total weight of the calcium sulfate composition.

4. The piling of claim 1 wherein said thermoplastic resin of said element is a polyolefin.

5. The piling of claim 1 wherein said composition of said core element comprises an epoxidized soybean oil.

6. The piling of claim 3 wherein said thermoplastic resin of said core element is present at a level of from 40 to 75 percent by weight based on the total weight of the thermoplastic composition, said calcium sulphate composition being present at a level of from 25 to 60 percent by weight based on the total weight of the thermoplastic composition of said core element, and comprising an epoxidized oil present at a level of from 0.5 to 8 percent by weight based on the total weight of said thermoplastic composition of said core element.

7. The piling of claim 1 wherein said sheath comprises a photoluminescent inner coating.

8. The piling of claim 1 wherein said thermoplastic resin is transparent.

9. The piling of claim 1 wherein said sheath is annular and comprises (i) an admixture of a transparent thermoplastic resin and a photoluminescent material and (ii) an inner coating of photoluminescent material.

10. A bridge structure comprising a piling of claim 1.

* * * * *